United States Patent [19]
Rheinfrank, Jr. et al.

[11] 4,105,421
[45] Aug. 8, 1978

[54] DISPOSABLE FILTER CARTRIDGE

[75] Inventors: Lamson Rheinfrank, Jr., Kansas City, Mo.; Richard P. Bundy, Prairie Village, Kans.; Jack T. Clements, Raytown, Mo.

[73] Assignee: Standard Havens, Inc., Kansas City, Mo.

[21] Appl. No.: 690,886

[22] Filed: May 28, 1976

[51] Int. Cl.² .......................................... B01D 46/02
[52] U.S. Cl. ........................................ 55/379; 55/381; 55/DIG. 26
[58] Field of Search ............... 55/302, 376, 378, 379, 55/381, 492, DIG. 26, 341 R, 374, 377; 210/411, 457; 248/95

[56] References Cited

U.S. PATENT DOCUMENTS

| | | | |
|---|---|---|---|
| 1,389,482 | 8/1921 | Beth | 55/378 |
| 2,079,315 | 5/1937 | Dickerson | 55/381 |
| 2,805,731 | 9/1957 | Kron | 55/DIG. 26 |
| 2,814,357 | 11/1957 | Bowman | 55/381 |
| 2,862,308 | 3/1958 | Koupal | 210/457 |
| 3,410,061 | 11/1968 | Knight | 55/381 |
| 3,421,295 | 1/1969 | Swift et al. | 55/302 |
| 3,429,107 | 2/1969 | Graves | 55/381 |
| 3,765,152 | 10/1973 | Pausch | 55/302 |
| 3,877,899 | 4/1975 | Bundy et al. | 55/302 |
| 3,884,659 | 5/1975 | Ray | 55/379 |

FOREIGN PATENT DOCUMENTS

| | | | |
|---|---|---|---|
| 401,410 | 9/1924 | Fed. Rep. of Germany | 55/378 |
| 1,201,841 | 8/1970 | United Kingdom | 55/378 |

*Primary Examiner*—Bernard Nozick
*Assistant Examiner*—David L. Lacey
*Attorney, Agent, or Firm*—Lowe, Kokjer, Kircher, Wharton & Bowman

[57] ABSTRACT

A disposable filter cartridge for suspension from the tube sheet in a baghouse. A wire mesh cylindrical cage is rigidly fitted with a diffuser having plurality of flexible fingers which sealingly encircle the tube sheet collar. A fabric filter sleeve encases the cage and has an upper seal skirt of greater diameter than the outside diameter of the diffuser. The cage may be equipped with a bottom end cap having an annular groove adjacent the cage to facilitate crimping thereon. The bottom of an open filter sleeve may be provided with a cuff having a continuous sealing band disposed therein of slightly larger diameter than the bottom end cap.

11 Claims, 13 Drawing Figures

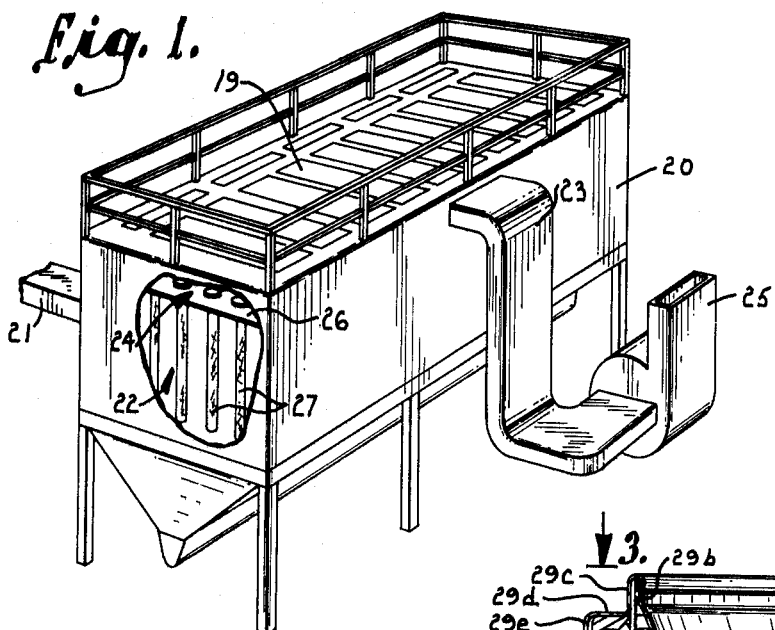
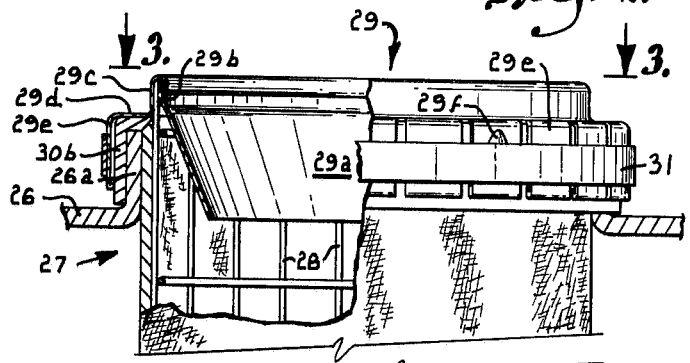
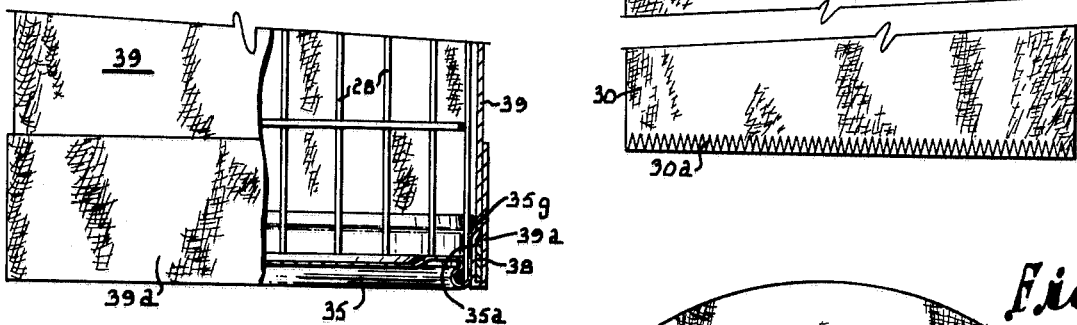
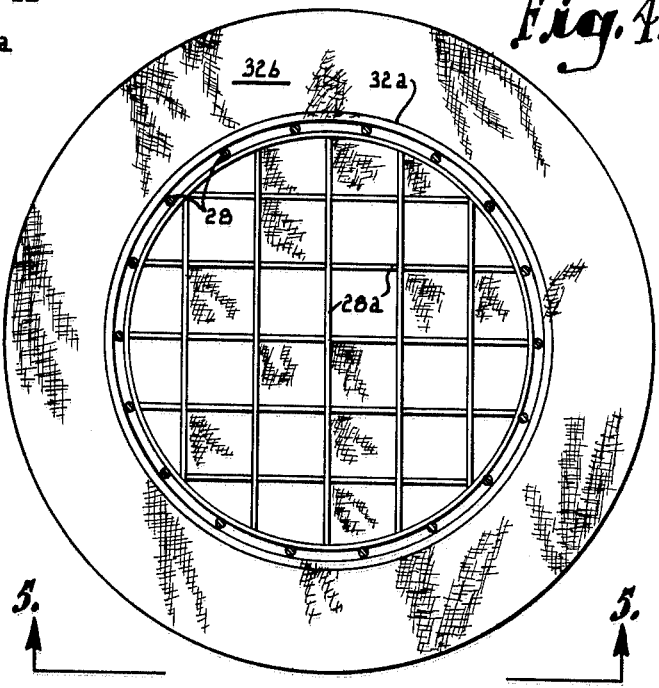

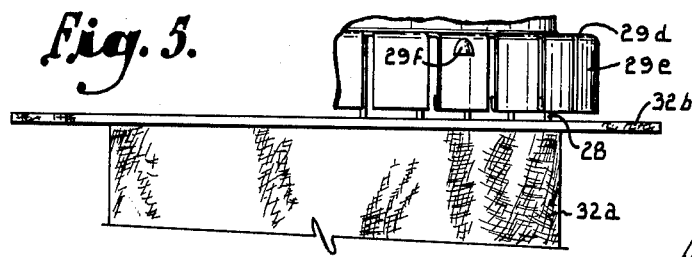
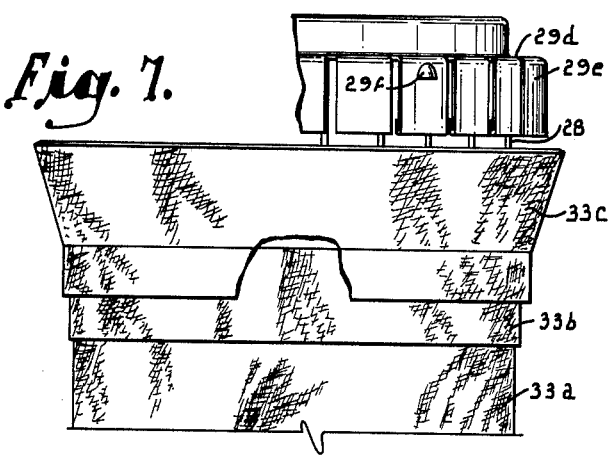
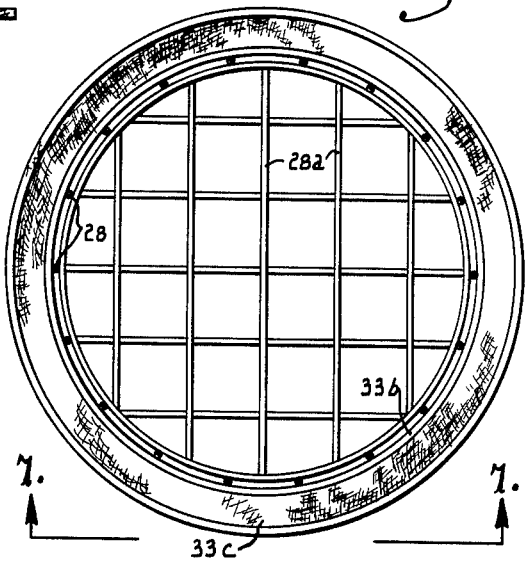
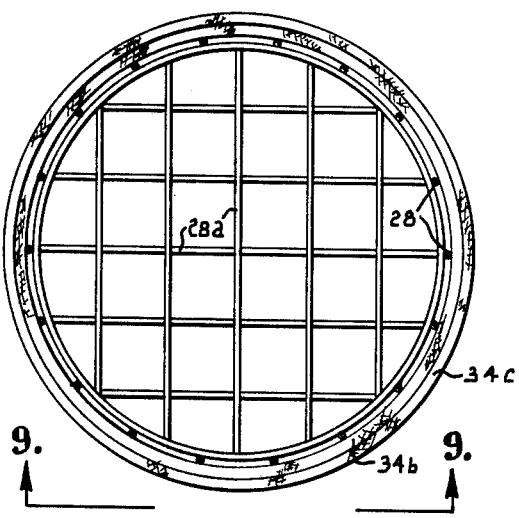
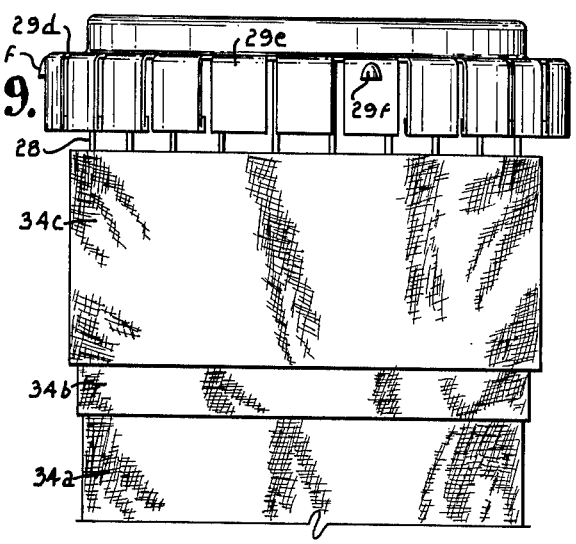

DISPOSABLE FILTER CARTRIDGE

BACKGROUND AND SUMMARY OF THE INVENTION

This invention relates to industrial baghouses and, more particularly, to an improved cage, bag and diffuser assembly for a baghouse to facilitate maintenance.

Continuous emphasis on environmental quality has resulted in increasingly strenous regulatory controls on industrial emissions. One technique which has proven highly efficient in controlling air pollution has been the separation of undesirable particulate matter from a gas stream by fabric filtration.

Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by one or more tube sheets. Disposed within openings communicating with the plenums are fabric filters. A particle-laden gas stream, induced by the action of a fan, blows into one chamber (dirty air plenum) wherein dust accumulates on the fabric filter as the gas passes through the fabric into the other chamber (clean air plenum) and out the exhaust.

Although all baghouses are designed in accordance with the foregoing general principles, there are numerous operational and structural distinctions. The present invention relates to a baghouse wherein the dirty and clean air plenums are separated by a tube sheet having a plurality of vertically suspended filter bags in which cylindrical wire cages are inserted for skeletal support. Filtration of the process gas occurs from outside to inside of the bags. As a result, baghouses constructed in this manner are normally referred to as outside bag collectors.

During continuous operation of the baghouse the bags must be periodically cleaned to remove the filter cake which is deposited on the fabric. One of two cleaning methods are typically employed in an outside bag collector. In pulsing-plenum cleaning, high pressure air is introduced to a compartment in the clean air plenum and the dust cake is simultaneously dislodged from all filter bags in that compartment. With pulse jet cleaning, on the other hand, the upper end of the cage is equipped with a diffuser, venturi or nozzle directed interiorly of the cage and a short blast of high pressure air or a discharge of low pressure, high volume air is individually introduced through each nozzle. This pulse of air travels through the filter sleeve to dislodge the dust cake.

Further details of a baghouse having cages and bags suspended from a tube sheet and employing pulse jet cleaning may be found in U.S. Pat. No. 3,876,402 by Bundy et al. issued Apr. 8, 1975, and specifically incorporated herein by reference.

It is of course inevitable that, in service, bags within the baghouse will develop leaks or ruptures which impair the efficiency in removing particulate matter from contaminated gas. However, in order to stay within industrial emissions standards and operate at peak efficiency, it is imperative that defective bags be identified and replaced. Proper baghouse maintenance is therefore of crucial importance.

The replacement of defective bags has traditionally been a time-consuming and costly maintenance operation requiring at least two workmen. With the top access door of the clean air plenum removed, the bag to be replaced is first located. Next the venturi or nozzle, such as venturi 40 in FIG. 5 of U.S. Pat. No. 3,876,402, is removed and laid aside for installation later. The clamping band, such as band 60 of U.S. Pat. No. 3,876,402, is then removed from around the tube sheet collar, such as collar 31(b) of the foregoing patent. The cage and bag, such as cage 41 and bag 42 of U.S. Pat. No. 3,876,402, is then lifted from the tube sheet and one workman lowers the bag and cage assembly to a second workman on the ground. The filter sleeve is then stripped off of the cage. At this phase of the maintenance operation it is common to encounter bags which are fused to the cage and require additional stripping time. Once the bag is removed, however, the cage is thoroughly inspected for corrosion and sharp edges that may tear or weaken the filter fabric. Such areas must be filed or brushed to present a smooth surface once again. Cages in bad condition must be replaced altogether. A new filter sleeve is then carefully fitted over the reconditioned or replaced cage and the assembly is again raised to the top of the baghouse. The assembly is carefully lowered into the appropriate opening in the tube sheet and the fabric filter is folded over the tube sheet collar and encircled with a clamping band. Finally, the venturi or nozzle is replaced and should be carefully aligned in the opening to the cage-bag assembly. Any misalignment of the nozzle will naturally misdirect the cleaning pulse during subsequent cleanings and can result in premature bag failure and inefficient cleaning.

As apparent from the foregoing description, the prior art maintenance procedure is not only costly and time-consuming but, when properly done, requires exceptional care. Accordingly, there is a long felt need in this industry for improvements in bag, cage and nozzle assemblies to alleviate the many maintenance difficulties which have been encountered in the past. The primary goal of this invention is to meet this need.

More specifically, an object of this invention is to provide an improved cage, bag and nozzle assembly to decrease maintenance time and costs heretofore associated with baghouse operations. Also, the improved assembly achieves the added advantage of prolonging bag life which; in turn, results in a less rigorous maintenance schedule. These advantages are achieved by provision of a unitary and preassembled filter cartridge which replaces the three separate components comprising the bag, cage and diffuser in a conventional outside bag collector and which may be discarded entirely when it is necessary to replace the filter.

Another object of the invention is to provide an integrally joined cage and nozzle construction which rigidly maintains alignment of the nozzle with respect to the cage to insure proper jet pulse cleaning after installation. As an adjunct to this object, the improved construction eliminates the requirement of a separate collar to be spot welded on the upper cage assembly for tensioning the bag as has been practiced by this industry.

Another object of the invention is to provide an improved cage fabricated of wire mesh chosen to optimally support a filter bag yet still permit unrestricted flow through the filter. High speed photography tests reveal that the wire cage can actually block air flow through the filter and thus impair efficiency of the baghouse in both filter and cleaning operations. To minimize this effect, it has been determined that a wire mesh cage is best fabricated from wire $\frac{1}{2}$ inch to 1 inch by 1 inch to 2 inches in the range of 14 to 16 gauge wire.

An additional object of this invention is to provide a filter cartridge of the character described which is self-sealing upon installation in the tube sheet. Thus, the prior time-consuming methods of carefully folding the bag itself over the tube sheet collar or the even more undesirable situation of requiring a sealing material separate of the bag are outmoded by this filter cartridge. The preassembled cartridge is simply inserted in the tube sheet and press fitted to the collar of the tube sheet to achieve an effective seal thereagainst.

A further object of the invention is to provide an improved bag construction for an outside bag collector to permit utilization of a filter sleeve of cylindrical construction having two open ends. Outside bag collectors have traditionally employed a cylindrical bag having a sewn in bottom. Naturally this feature requires a separate manufacturing operation during the bag fabrication. Inasmuch as all of the process gas in a baghouse must necessarily flow past the bottoms of the bags, the bottom is a point of high wear and acts as a baffle within the dirty air plenum. In one embodiment of this invention, the bag is constructed from a cylindrical sleeve having a specially designed reinforced cuff which seals against the bottom pan or end closure secured to the bottom of the cage.

Yet another object of the invention is to provide an improved end cap for a cage assembly to be used with filter sleeves having an open bottom. When an open bottom filter sleeve has been used in this industry, it is necessary that the bottom of the cage be fitted with an end cap. The end cap may be welded to the bottom of the cage and the filter sleeve is secured thereto by means of an adjustable clamping band such as a conventional hose clamp. The construction of this invention provides for an end cap which may be crimped onto the cage without splitting or otherwise rupturing the end cap as has been encountered in crimping operations.

Other and further object of the invention, together with the features of novelty appurtenant thereto, will appear in the course of the following description of the drawings.

DESCRIPTION OF THE DRAWINGS

In the accompanying drawings, which form a part of the specification and are to be read in conjunction therewith, and in which like reference numerals are employed to indicate like parts in the various views:

FIG. 1 is a perspective view of an outside bag collector typical of the type for which the filter cartridge herein is designed;

FIG. 2 is a side elevational, partly sectional, view of a disposable filter cartridge constructed in accordance with a preferred embodiment of the invention, the break lines indicating continuous length of the filter bag;

FIG. 4 is a top plan view of a first alternative construction of an improved filter bag;

FIG. 5 is a side elevational view of the filter bag taken along line 5—5 of FIG. 4 in the direction of the arrows with a fragmentary portion of the diffuser and cage assembly being slightly withdrawn from the bag for purposes of clarity;

FIG. 6 is a top plan view of a second alternative construction of an improved filter bag;

FIG. 7 is a side elevational view of the bag taken along line 7—7 of FIG. 6 in the direction of the arrows, the fragmentary portion of the diffuser and cage assembly being slightly withdrawn from the bag for purposes of clarity;

FIG. 8 is a top plan view of a third alternative construction of an improved filter bag;

FIG. 9 is a side elevational view of the bag taken along line 9—9 of FIG. 8 in the direction of the arrows;

FIG. 13 is a side elevational, partly sectional, view of the bottom portion of an open ended filter bag constructed in accordance with another embodiment of the invention.

Referring to FIG. 1 in more detail, the baghouse basically comprises a sheet metal housing 20 equipped with an inlet duct 21 to the dirty air plenum 22 and an outlet duct 23 from the clean air plenum 24. Process gas is pulled through the baghouse by means of a fan 25.

Figure 10:
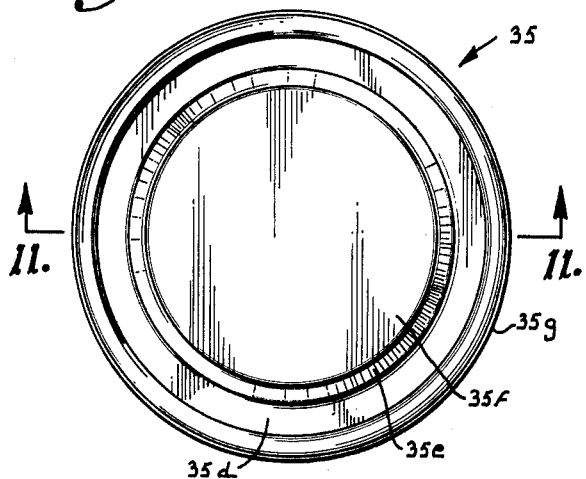
FIG. 10 is a bottom plan view of an end cap constructed in accordance with another embodiment of the invention.

Interiorly of the housing 20, the dirty and clean air plenums 22 and 24 are separated by a horizontal tube sheet 26 from which are suspended a plurality of filter cartridges 27. For replacement maintenance, access to the filters 27 is provided through the clean air plenum 24 by one or more doors 19 in the roof of the housing.

Figure 3:
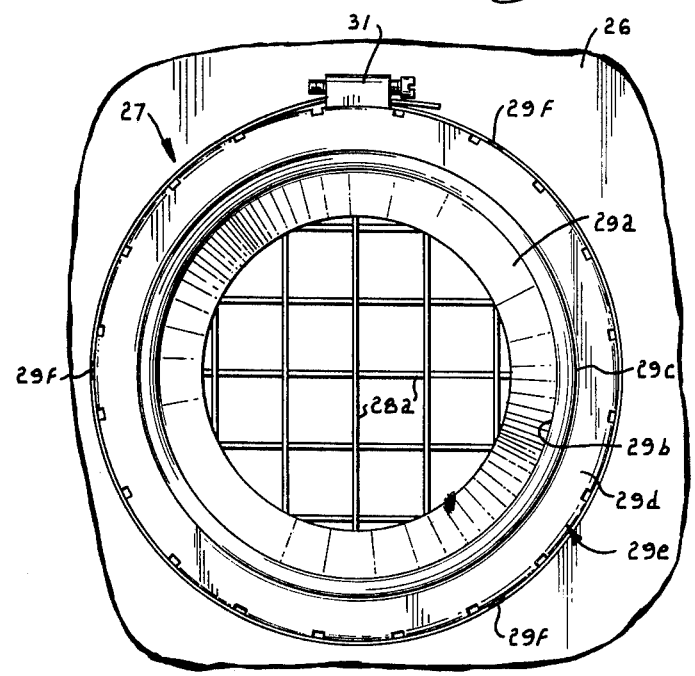
FIG. 3 is a top plan view of the cage-bag assembly taken along line 3—3 of FIG. 2 in the direction of the arrows.

Particular attention is now directed to the filter cartridge 27 illustrated in FIGS. 2 and 3. The cage of the cartridge comprises a cylindrical wire mesh cage 28 having a wire mesh bottom 28a and open at the upper end thereof. The cage is preferably fabricated from wire mesh in the range of ½ by 1 inch or 1 by 2 inches in either 14 or 16 gauge. A ½ by 1 inch size in 14 gauge is best for use with felted fabric filters and a 1 by 2 inch size in 16 gauge is desirable for use with woven fabric filters.

Rigidly attached to the upper end of the cylindrical cage 28 is a diffuser member 29. The diffuser member 29 includes a central diffuser portion 29a, frusto-conical in shape, which extends interiorly of the upper opening of the cage 28. Integrally formed with the upper edge of the diffuser portion 29a is a cylindrical channel defined by vertical opposed walls 29b and 29c which receive the upper edge of the cage 28 therebetween. The interior wall 29b may be crimped against the cage 28 and the outer wall 29c to rigidly join the diffuser member 29 with the cage 28 and maintain alignment therewith. Integrally joined to the lower edge of the outer wall 29c is a horizontally disposed shelf 29d adapted to overlie the upstanding collar 26a of the tube sheet 26 when the filter cartridge 27 is installed thereon. A plurality of downwardly extending flexible fingers 29e are integrally joined to the outer edge of the shelf portion 29d, being adapted to encircle the upstanding collar 26a on the tube sheet when the filter cartridge 27 is installed. Several of the flexible fingers 29e around the periphery of the diffuser member 29 are equipped with outwardly projecting bosses 29f formed in the upper surfaces of the fingers.

FIG. 2 illustrates use of the diffuser-cage assembly 28 and 29 with a conventional filter bag 30 having a sewn in bottom 30a and the upper end 30b thereof folded over the upstanding collar of the tube sheet as is required prior to full insertion of the cage assembly. To complete installation, a clamping band 31, such as a conventional hose clamp, encircles the flexible fingers 29e of the diffuser member and is disposed with its upper edge beneath the bosses 29f in order to prevent the band 31 from slipping upwardly. Tightening of the band 31 causes the flexible fingers 29e to seal the upper portion 30b of the bag against the upstanding collar 26a of the tube sheet.

It should be noted that with the foregoing cage construction, proper alignment is maintained between the cage 28 and diffuser 29 by virtue of the rigid attachment of the diffuser to the cage. Since the diffuser is rigidly attached and has a low profile it may be walked on by maintenance workers in the clean air plenum without displacing the diffuser relative to the cage or the cage relative to the tube sheet. This of course speeds replacement and normal maintenance of the baghouse.

In order to achieve a self-sealing feature for use in conjunction with the foregoing cage assembly, FIGS. 4 through 9 disclose three alternative constructions of an improved filter bag. With reference first to FIGS. 4 and 5, the bag includes a cylindrical sleeve 32a having an inside diameter substantialy equal to the outside diameter of the cage 28. Attached to the upper edge of the sleeve 32a is a circular annulus 32b having a width at least as great as the width of the shelf 29d plus the vertical length of the flexible fingers 29e on the diffuser member 29. Furthermore, it is important to this invention that the outer diameter of the annulus 32b be larger than the diameter of the diffuser member 29 defined by the flexible fingers 29e. The particular bag illustrated in FIGS. 4 and 5 is fabricated of a felted material and, thus, it is unnecessary to provide a hem at the upper end of the bag and the annulus 32b may be stitched directly to the upper edge of the sleeve 32a. If, on the other hand, a woven fabric is employed as the filter media, it is typical to provide a hem at the upper edge of the sleeve 32a in order to prevent unraveling of the material. In such event, the inside diameter of the annulus 32b would be stitched to the upper edge of the hem.

FIGS. 6 and 7 illustrate a second alternative bag construction. Again, the bag includes a cylindrical sleeve 33a which encases the cage. Inasmuch as the fabric illustrated is a woven material, the bag is provided with a hem 33b at the upper edge thereof. Attached to the hem 33b and extending upwardly therefrom is a frusto-conical flare 33c having an inside diameter at the upper edge thereof greater than the diameter of the diffuser member defined by the flexible fingers 29e. The flare 33c is furthermore of sufficient length to at least equal the width of the shelf portion 29d plus the vertical length of the flexible fingers 29e of the diffuser.

In the event the bag is fabricated of felted material, the hem illustrated in FIG. 7 may be eliminated and the lower portion of the flare 33c may be stitched directly to the upper end of the bag itself.

FIGS. 8 and 9 illustrate a third alternative bag construction. The bag includes a cylindrical sleeve 34a which encases the cage 28. Inasmuch as the fabric illustrated is a woven material, the bag is provided with a hem 34b at the upper edge thereof. Attached to the hem 34b and extending upwardly therefrom is a cylindrical skirt 34c which extends above the upper edge of the hem 34b a distance at least as great as the length of the shelf 29d plus the vertical length of the flexible fingers 29e on the diffuser member. As will be noted in FIG. 9 with respect to the third bag construction, the skirt 34c in the condition illustrated when it is initially slipped onto the cage 28 does not have a diameter larger than the outside diameter of the diffuser member as defined by the flexible fingers 29e. Accordingly, it is imperative that the skirt 34c be fabricated of a stretchingly deformable material, such as a deformable felt, which may be hand stretched and deformed to provide an opening at the upper end thereof larger than the diameter of the diffuser member 29. In other words, the seal illustrated in FIG. 9 is easily stretched to a position such as that shown in FIG. 7.

In FIGS. 5, 7 and 9, the cage 28 and diffuser 29 are illustrated slightly withdrawn from the bag for purposes of clarity. Prior to installation in the tube sheet 26, however, the lower edges of the flexible fingers 29e of the diffuser engage the seal itself. That is, in FIG. 5 the fingers 29e contact the upper surface of the annulus 32b, in FIG. 7 the fingers 29e contact and are received slightly within the flare 33c, and in FIG. 9, with the material stretched out to a position such as shown in FIG. 7, the fingers 29e likewise engage the skirt 34c and are received slightly within the upper opening thereof.

During installation, the cage and bag cartridge 27 is inserted through an opening in the tube sheet 26 and lowered until the upstanding collar 26a of the tube sheet engages the back or exterior surface of the seal apron (i.e., annulus 32b, flare 33c, or stretchable skirt 34c depending upon which bag construction is employed). Thereafter, downward pressure is applied to the diffuser 29 and the cage 28 is fully inserted into the bag and seated against the upstanding collar 26a of the tube sheet as shown in FIG. 2. Since the outermost diameter of the seal apron (i.e., annulus 32b, flare 33c or skirt 34c) is larger than the diameter of the flexible fingers, the seal is automatically folded over the upstanding collar 26a of the tube sheet as a downward force is applied to the diffuser 29. In other words, it is not necessary to separately fold the seal over the upstanding collar prior to full seating of the diffuser. Also, when the diffuser is properly seated on the tube sheet collar, proper alignment of the filter cartridge 27 within the dirty air plenum 22 is insured. Proper alignment of the nozzle portion 29a with respect to the cage 28 is of course insured by virtue of the crimping seal between the cage 28 and diffuser 29.

With the cartridge 27 fully seated on the tube sheet collar 26a, a clamping band 31 is fitted to encircle the flexible fingers 29e and be disposed beneath the bosses 29f thereon. Tightening of the clamping band 31 causes the flexible fingers 29e to reduce in diameter and bias the seal 32b, 33c or 34c against the tube sheet collar 26a, thus insuring a leakfree seal and completing the installation of the cartridge 27. When it is desirable to again replace the filter, it is necessary only to remove the clamping band 31 and to discard the used cartridge 27 in its entirety including the bag, cage and diffuser. A new cartridge 27 may then be inserted in the tube sheet as described and the entire maintenance can be accomplished by one man and with only one trip to the top of the baghouse.

Figure 11:
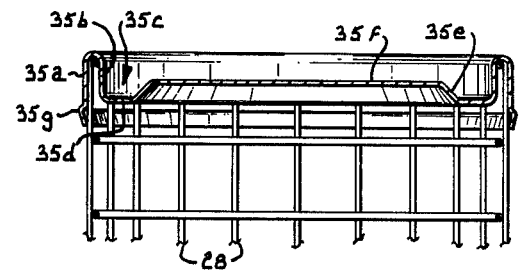
FIG. 11 is an inverted, side elevational view of the end cap taken along line 11—11 of FIG. 10 in the direction of the arrows and illustrating the cap prior to the crimping thereof onto the cylindrical cage.

All of the foregoing bag constructions may employ a cage 28 having a wire bottom and a bag having a sewn in fabric bottom. For use with any of the previous bags, however, there is provided (as shown in FIGS. 10-13) a cage end cap 35 to permit use of bags having an open bottom. With particular reference to FIGS. 10 and 11, the cap 35 includes exterior and interior walls 35a and 35b integrally joined to define a channel therebetween which receives the wire cage 28. The lower end of the inner wall 35b is integrally joined to a circumferential groove 35c defined by the lower portion of the inner vertical wall, a substantially horizontal bottom portion 35d and an inclined or sloping side wall 35e. Integrally joined to the side wall 35e of the circumferential groove and closing the center portion of the cap is a circular plate 35f. Completing the construction of the end cap, a peripheral ridge 35g is formed in the outer vertical wall 35a of the cap.

The circular groove 35c adjacent the interior vertical wall 35b of the end cap forms an important feature of the cap 35. Of critical importance is the depth of the groove 35c. The depth of the groove is defined as the vertical distance from the plane of the circular center plate 35f to the bottom portion 35d of the groove. Tracing along the lateral surface of the groove 35c in FIG. 11, the distance from the outer edge of the circular center plate 35f along the sloping side wall 35e and across the bottom portion 35d of the groove and up the inner wall 35b to a point of intersection with the imaginary, extended plane of the circular plate 35f must be equal to or greater than the horizontal distance between the outer edge of the circular center plate 35f to a point in the imaginary plane of the center plate 35f just touching the vertical wires of the cage 28.

Figure 12:
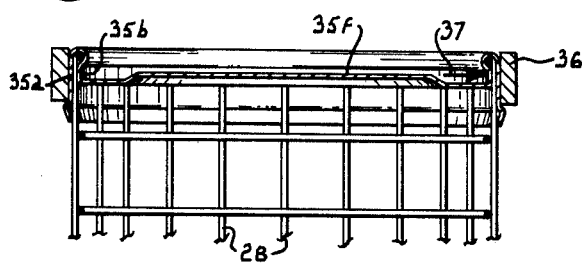
FIG. 12 is an inverted, side elevational view of the end cap shown in FIG. 11, but illustrating the end cap fully crimped and positioned in a crimping jig with a crimping force indicated by the arrow.

With the cap 35 inserted over the end of the cage 28 as shown in FIG. 11, the assembly is placed in a crimping jig as illustrated in FIG. 12. The circular jig 36 is substantially the same diameter as the outer wall 35a of the cap and a crimping force, as schematically illustrated by the arrow 37, forces the inner vertical wall 35b toward the outer verticall wall 35a to crimp the cage 28 therebetween. As can be appreciated by comparing FIG. 11 with FIG. 12, during the crimping operation, the depth of the annular groove 35c decreases to facilitate crimping without rupturing the end cap.

With the end cap 35 so installed on the bottom of the cage 28, an open bottom filter sleeve may be fitted around the cage and as adjustable clamping band may be tightened around the filter to bias the fabric to the outer wall 35a of the cap. During tensioning of the bag along the cage, the ridge 35g of the cap assists in preventing slippage of the clamping band or filter.

Alternatively, and as a part of this invention, there is provided a modification of the lower end of the bag to facilitate installation of the bag on the cage. This modification is illustrated in FIG. 13. A continuous metal ring 38 is disposed within a sewn cuff 39a in the bottom end of the filter bag 39. The ring 38 is so sized as to have an inside diameter equal to or slightly larger than the outside diameter of the vertical outer wall 35a of the cap, but a smaller diameter than the outside diameter of the ridge 35g formed in the cap 35.

So constructed, the cage assembly is inserted into the bag 39 and the ring 38 and cuff 39a at the lower end of the bag are easily pushed onto the end cap 35 to encircle the outer wall thereof as illustrated in FIG. 13. The peripheral ridge 35g prevents the upward displacement of the ring 38 relative to the cage.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is comtemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A cage and diffuser assembly for installation on a tube sheet collar in a baghouse as support for a fabric filter, said assembly comprising:
    a cylindrical cage having an open upper end; and
    an air diffuser secured to the upper end of said cage and having an open central portion projecting interiorly of said cage to direct air thereto, said diffuser further having an outside circular diameter defined by a plurality of downwardly extending flexible fingers adapted to encircle the tube sheet collar for sealing engagement therewith.

2. The assembly as in claim 1, said air diffuser including a cage receiving channel intermediate said central portion and said flexible fingers, said channel receiving the upper end of said cage for rigid crimping engagement therewith.

3. The assembly as in claim 1, including an adjustable clamping band encircling said flexible fingers to bias same inwardly.

4. The assembly as in claim 1, said cage fabricated from ½ by 1 inch wire mesh in the range of 14 to 16 gauge.

5. The assembly as in claim 1, said cage fabricated from 1 by 2 inches wire mesh in the range of 14 to 16 gauge.

6. A disposable filter cartridge for installation on a tube sheet collar in a baghouse, said filter cartridge comprising:
    a cylindrical cage having an open upper end;
    an air diffuser rigidly attached to the upper end of said cage and having an open central portion projecting interiorly of said cage to direct air thereto, said diffuser further having an integrally formed, outside circular band comprising a plurality of downwardly extending flexible fingers adapted to encircle the tube sheet collar for sealing engagement therewith;
    an adjustable clamping band encircling said flexible fingers to bias same inwardly;
    a cylindrical fabric filter sleeve encasing said cage, and having an open upper end; and
    a sealing apron connected to the upper end of said filter sleeve, said apron having an upper portion greater in diameter than the outside diameter of said circular band of said diffuser, with the extent of said apron from said sleeve being at least equal to the vertical height of said flexible fingers;
    whereby said cartridge is installed in the baghouse by pressing said diffuser downwardly against said tube sheet collar to fold said sealing apron over said collar to be biased to sealingly engage therewith by said flexible fingers.

7. The cartridge as in claim 6, said air diffuser including a cage receiving channel intermediate said central portion and said band, said channel receiving the upper end of said cage for rigid crimping engagement therewith.

8. The filter cartridge as in claim 6, said sealing apron formed as a circular annulus with the inside diameter attached to the upper end of said sleeve and having an outside diameter larger than the diameter of said sleeve.

9. The filter cartridge as in claim 6, said sealing apron being frusto-conical in shape with the lower, inside diameter attached to the upper end of said sleeve and having an upper, outside diameter larger than the diameter of said sleeve.

10. A filter cartridge for installation in an outside bag collector, said cartridge comprising:
   a cylindrical cage having open upper and lower ends;
   a circular cap secured to the lower end of said cage, said cap including an outer cylindrical clamping surface and a peripheral ridge projecting outwardly from said clamping surface;
   a filter sleeve encasing said cage and having an open bottom;
   a cuff formed in the bottom of said filter sleeve adjacent said circular cap; and
   a continuous band disposed within said cuff to encircle said clamping surface of said cap and thereby seal the bottom of said filter sleeve against said cap.

11. The filter cartridge as in claim 10, said continuous band being larger in diameter than said clamping surface but smaller in diameter than said peripheral ridge.

* * * * *